(12) United States Patent
Iino et al.

(10) Patent No.: US 10,946,737 B2
(45) Date of Patent: Mar. 16, 2021

(54) FUEL VALVE

(71) Applicant: TOYODA GOSEI CO., LTD., Kiyosu (JP)

(72) Inventors: Takuro Iino, Kiyosu (JP); Hiroaki Kito, Kiyosu (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 16/278,277

(22) Filed: Feb. 18, 2019

(65) Prior Publication Data

US 2019/0263256 A1   Aug. 29, 2019

(30) Foreign Application Priority Data

Feb. 23, 2018   (JP) .............................. JP2018-030472

(51) Int. Cl.
| | | |
|---|---|---|
| *B60K 15/03* | (2006.01) | |
| *B60K 15/035* | (2006.01) | |
| *F16K 24/04* | (2006.01) | |

(52) U.S. Cl.
CPC .. *B60K 15/03504* (2013.01); *B60K 15/03519* (2013.01); *F16K 24/042* (2013.01); *Y10T 137/0874* (2015.04); *Y10T 137/3099* (2015.04)

(58) Field of Classification Search
CPC ........ B60K 15/03504; B60K 15/03519; B60K 2015/03576; B60K 2015/03514;

(Continued)

(56) References Cited

U.S. PATENT DOCUMENTS 2,396,233 A * 3/1946 Abrams ............. B60K 15/0406
220/203.2
5,443,561 A * 8/1995 Sakata ............. B60K 15/03519
137/202

(Continued)

FOREIGN PATENT DOCUMENTS

| CN | 105705361 A | 6/2016 |
|---|---|---|
| JP | 2005-299577 A | 10/2005 |
| JP | 2011-178379 A | 9/2011 |

OTHER PUBLICATIONS

Chinese Office Action dated May 15, 2020 issued in corresponding CN application No. 201910128777.9 ( with English translation).

(Continued)

*Primary Examiner* — Craig J Price
(74) *Attorney, Agent, or Firm* — Posz Law Group, PLC

(57) ABSTRACT

A first casing has an internal cylindrical region defined as a floating/sinking guiding region for a float valve. The wall that forms the cylindrical region includes ventilation windows. A second casing surrounds the first casing to form, about the periphery of the first casing, a ventilation passage that guides fuel vapor in a fuel tank to the ventilation windows through a region that surrounds the first casing. In addition, the second casing surrounds the first casing from a first connection hole side to form, about the periphery of the first casing, a first ventilation passage that guides the fuel vapor in the fuel tank to the ventilation windows through the region that surrounds the first casing, and a second ventilation passage that has a larger passage cross-sectional area than the first ventilation passage. These ventilation passages stabilize floating/sinking operation of the float.

5 Claims, 7 Drawing Sheets

(58) Field of Classification Search
CPC .... B60K 2015/03019; B60K 15/03289; F16K 24/042; F16K 24/046; F16K 24/048; F16K 31/18; F16K 31/20; F16K 31/22; F16K 24/04; F16K 24/06; F16K 24/044; F16K 27/07; F16K 33/00; Y10T 137/0874; Y10T 137/3099; Y10T 137/0777; Y10T 137/86324; F16L 47/02; F16L 47/14; F02M 37/017; F02M 37/0076; F02M 25/08
USPC ..... 137/43, 202, 15.26, 315.08, 38, 39, 409, 137/429, 430, 587, 588; 220/86.2, 745, 220/746; 141/59, 198, 202, 229; 123/516, 518, 198 D, 520
See application file for complete search history.

(56) References Cited

U.S. PATENT DOCUMENTS

| | | | | |
|---|---|---|---|---|
| 5,669,361 | A * | 9/1997 | Weissinger | B60K 15/03519 123/520 |
| 5,687,753 | A * | 11/1997 | Doll | B60K 15/03504 137/43 |
| 5,950,655 | A * | 9/1999 | Benjey | B60K 15/03519 137/202 |
| 6,311,675 | B2 * | 11/2001 | Crary | B60K 15/03519 123/516 |
| 6,439,206 | B1 * | 8/2002 | Shimamura | F02M 25/0836 123/516 |
| 6,901,943 | B2 * | 6/2005 | Yamada | B60K 15/03519 137/202 |
| 6,941,966 | B2 * | 9/2005 | Mori | B60K 15/03519 137/202 |
| 6,959,720 | B2 * | 11/2005 | Kurihara | B60K 15/03519 137/202 |
| 7,013,908 | B2 * | 3/2006 | Miyoshi | F16K 24/044 137/202 |
| 7,168,441 | B2 * | 1/2007 | Miyoshi | B60K 15/03519 137/202 |
| 7,243,639 | B2 * | 7/2007 | Ueki | F16K 24/044 123/516 |
| 8,770,218 | B2 * | 7/2014 | Tagami | F16K 31/18 137/202 |
| 9,428,043 | B2 * | 8/2016 | Marlow | B60K 15/035 |
| 2003/0098063 | A1 * | 5/2003 | Mori | B60K 15/03519 137/202 |
| 2005/0229967 | A1 | 10/2005 | Ueki | |
| 2010/0218748 | A1 * | 9/2010 | Arnalsteen | B60K 15/03519 123/516 |
| 2011/0186149 | A1 | 8/2011 | Tagami et al. | |
| 2015/0122347 | A1 | 5/2015 | Marlow et al. | |
| 2016/0250919 | A1 * | 9/2016 | Bae | B60K 15/03519 137/202 |

OTHER PUBLICATIONS

Office Action dated Oct. 6, 2020 issued in corresponding JP application No. 2018-030472 ( with English translation).

* cited by examiner

FUEL VALVE

CROSS-REFERENCE TO RELATED APPLICATION

The present application claims priority from Japanese application P2018-030472 filed on Feb. 23, 2018, the content of which is hereby incorporated by reference into this application.

BACKGROUND

1. Field

The present disclosure relates to a fuel valve.

2. Related Art

A fuel valve is mounted to a fuel tank, which is installed in a vehicle or other machine. The fuel valve ventilates and blocks ventilation of fuel vapor from the fuel tank to a canister through causing a float to float or sink. For example, the configuration described in Japanese Patent Unexamined Publication JP2005-299577A is known as a fuel valve of this type. The disclosed fuel valve guides a float to either float or sink using a plurality of ribs that protrude outward from a float storage region toward the float. In this fuel valve, the float storage region is defined as a semicircular heteromorphic region. Regions between the ribs that protrude outward the furthest are defined as ventilation passages for ventilating fuel vapor and are expanded about the float.

With the fuel valve proposed in the above-described Unexamined Publication, it is possible to prevent insufficient ventilation of fuel vapor because the ventilation passages are expanded. However, there is a demand for the following improvement. Fuel enters the float storage region and causes the float to float, but the ribs used for guiding flotation/sinking of the float may swell if the fuel permeates the ribs. In addition, the expanded portions of the ventilation passages may also swell. Flotation/sinking of the float is not affected if the degree of swelling in each of the ribs used for guiding flotation/sinking of the float is the same across all ribs. However, the degree of swelling in the ribs may differ between ribs. As a result, if some of the ribs swell, the flotation/sinking operation of the float may be unstable. When the flotation/sinking operation of the float is unstable, ventilation and blockage of the fuel vapor is less reliable. In light of the above, there is a demand for a fuel valve that may provide stable flotation/sinking operation of a float through expansion of ventilation passages for ventilating fuel vapor.

SUMMARY

The present disclosure has been made in light of the aforementioned problem and may be implemented as the following aspects.

(1) One aspect of a fuel valve is a fuel valve that enables and blocks communication with the inside of the fuel tank, the fuel valve including: a cylindrical first casing forming an internal region that communicates with a first connection hole connected externally to the fuel tank, the first casing having ventilation windows formed in a wall that forms the internal region; a float valve being incorporated into the first casing such that the float valve moves within the internal region of the first casing, the float valve opening/closing the first connection hole through the float moving by floating/sinking in the internal region according to a fuel liquid level in the internal region; and a second casing surrounding the first casing from the first connection hole side to form, about the periphery of the first casing, a first ventilation passage that guides fuel vapor in the fuel tank to the ventilation windows through a region that surrounds the first casing and a second ventilation passage that has a larger passage cross-sectional area than that of the first ventilation passage.

In the fuel valve in accordance with this aspect, because the cylindrical region in the first casing is defined as the region in which the float moves, that is, the floating/sinking region, swelling on an inner peripheral wall side is substantially constant, even if fuel enters the cylindrical region. As a result, floating/sinking movement operation of the float valve can be stabilized. In addition, according to the fuel valve of this aspect, the second ventilation passage for ventilating fuel vapor has a larger passage cross-sectional area than that of the first ventilation passage formed about the periphery of the first casing.

(2) In the fuel valve in accordance with the above-described aspect, the first casing may include an engaged portion to be engaged with the second casing, and the second casing may include an engagement portion that engages with the engaged portion in a state where the second casing is attached to the first casing surrounding the first casing. With this configuration, assembly work is simplified because the casings can be completely engaged with each other by assembling the second casing so as to surround the first casing.

(3) In the fuel valve in accordance with the above-described aspect, the second casing may include a holding seat face portion that holds the float valve in a state where the second casing is attached to the first casing surrounding the first casing. With this configuration, assembly work can be simplified and the number of components can be reduced because the float valve can be held by attaching the second casing so as to surround the first casing.

(4) In the fuel valve in accordance with the above-described aspect, the fuel valve may further include, a valve mechanism ventilating the fuel vapor from a second connection hole to a pipe body portion through opening/closing the second connection hole, the second connection hole being connected to the pipe body portion, a valve mechanism being aligned with the second casing, wherein the second ventilation passage is formed between the first casing and the second casing and the second ventilation passage is arranged at a position that does not overlap a straight line that connects the axes of the second casing and the valve mechanism to each other. This configuration has the following advantage. Namely, by forming and arranging the second ventilation passage to avoid overlapping the straight line that connects axes of the valve mechanism and the second casing to each other, dead space in both casings can be effectively used to form the second ventilation passage, even if the valve mechanism and the second casing are arranged next to each other as closely as possible. As a result, the device can be made smaller and space savings can be achieved.

The present disclosure may be implemented in the form of various aspects other than a fuel valve. For example, the present disclosure may be implemented as a fuel tank that includes a fuel valve, a manufacturing method for a fuel valve, or a fuel supply method that uses a fuel valve, and the like.

DETAILED DESCRIPTION

1. Device Configuration

Figure 1:
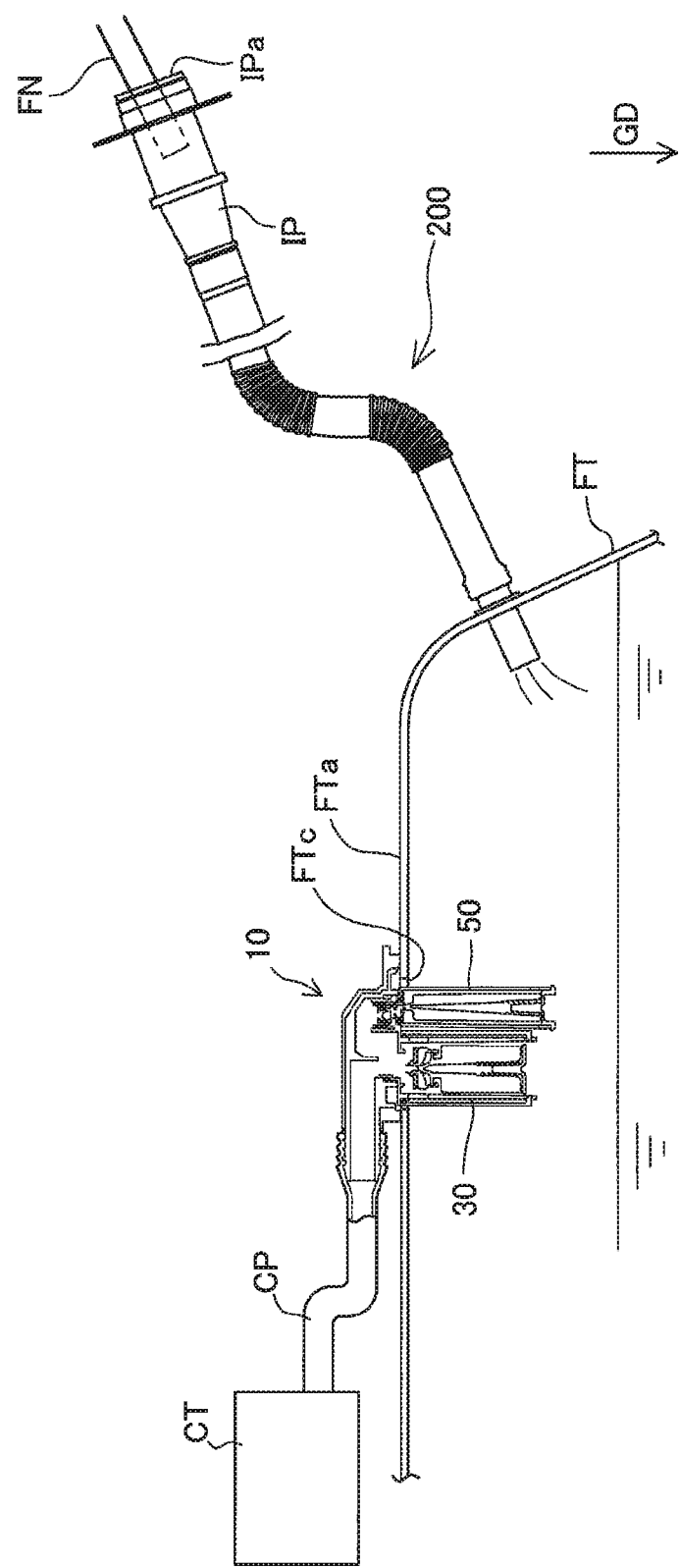
FIG. 1 is a schematic configuration diagram for illustrating a fuel tank and a fuel supply device with a fuel valve attached as one embodiment of the present disclosure.

FIG. 1 is a schematic configuration diagram for illustrating a fuel tank FT and a fuel supply device 200 with a fuel valve 10 attached as one embodiment of the present disclosure. The downward direction in FIG. 1 and subsequent figures coincides with a vertical downward direction GD.

The fuel supply device 200 and the fuel valve 10 are connected to the fuel tank FT. The fuel tank FT is installed in a vehicle, for example, an automobile and is configured of a barrier layer made of an ethylene vinyl alcohol copolymer (EVOH) and an outer layer made of polyethylene (PE). The fuel supply device 200 includes a fuel injection pipe IP. An injection port IPa is formed at one end portion of the fuel injection pipe IP. A fuel nozzle FN is inserted into the injection port IPa. The other end portion of the fuel injection pipe IP is disposed inside the fuel tank FT. Fuel that is supplied from the fuel nozzle FN is injected into the fuel tank FT via the fuel injection pipe IP. A fuel sensor (not shown) is disposed on an inner side of a tip portion of the fuel nozzle FN.

The fuel valve 10 is mounted to a mounting hole FTc provided on an upper wall FTa of the fuel tank FT. A lower portion of the fuel valve 10 is located inside the fuel tank FT. The entire fuel valve 10 may be built into the fuel tank FT. The fuel valve 10 is connected to an external canister CT using a canister connection pipe CP. The canister connection pipe CP corresponds to a connection pipe in the present disclosure. The canister CT contains activated charcoal. The canister CT absorbs and desorbs fuel evaporative emissions (fuel vapor) supplied from the fuel valve 10 through the canister connection pipe CP. The fuel valve 10 is a valve device used for communicating and blocking communication between the inside of the fuel tank FT and the canister connection pipe CP. In addition, the fuel valve 10 has a function of restricting fuel (fuel vapor) from flowing out to the canister CT when the fuel inside the fuel tank FT rises to a predetermined liquid level during fuel supply. Configurations and effects of each component of the fuel valve 10 are described below.

Figure 2:
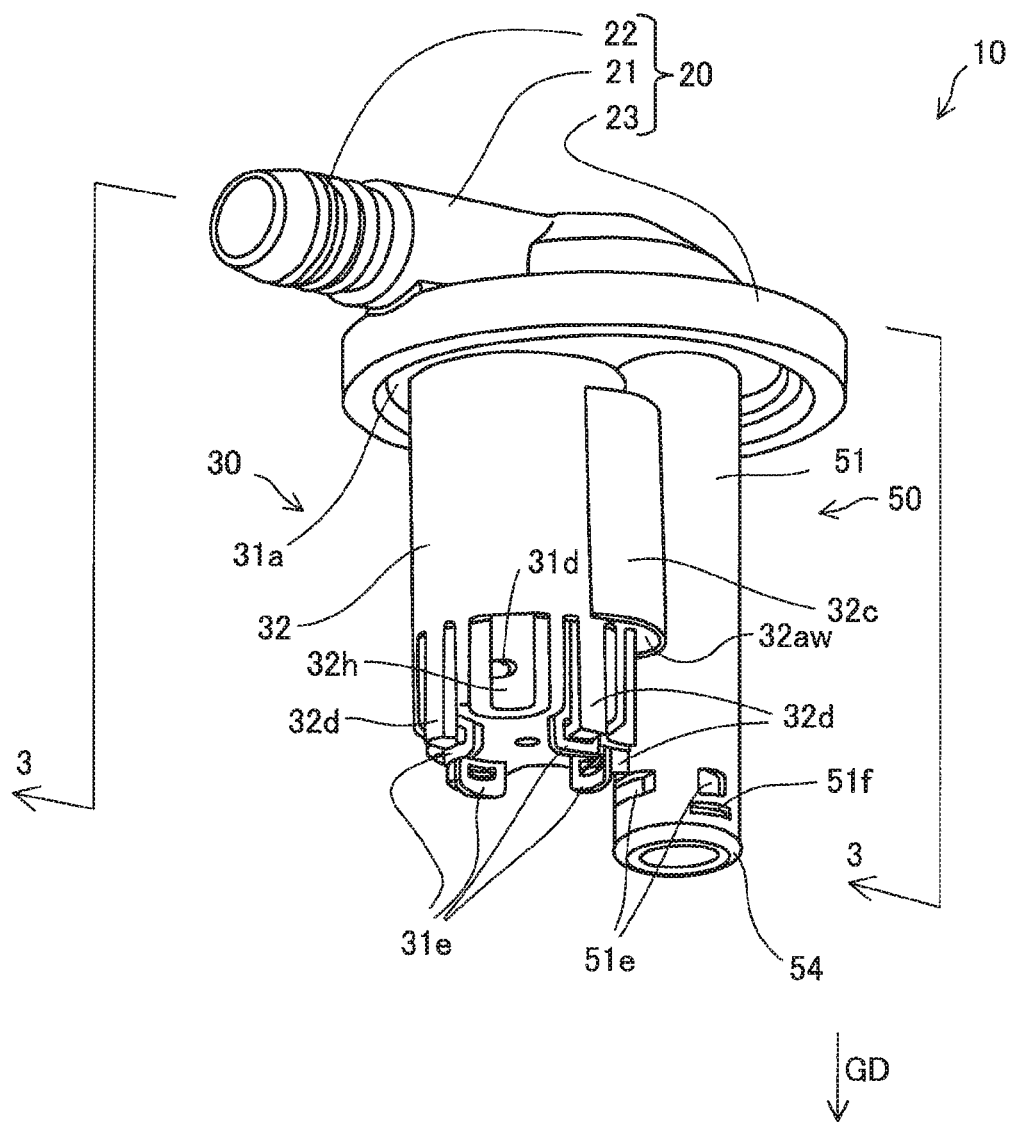
FIG. 2 is a perspective view for illustrating an outer appearance of the fuel valve according to the embodiment.
Figure 3:
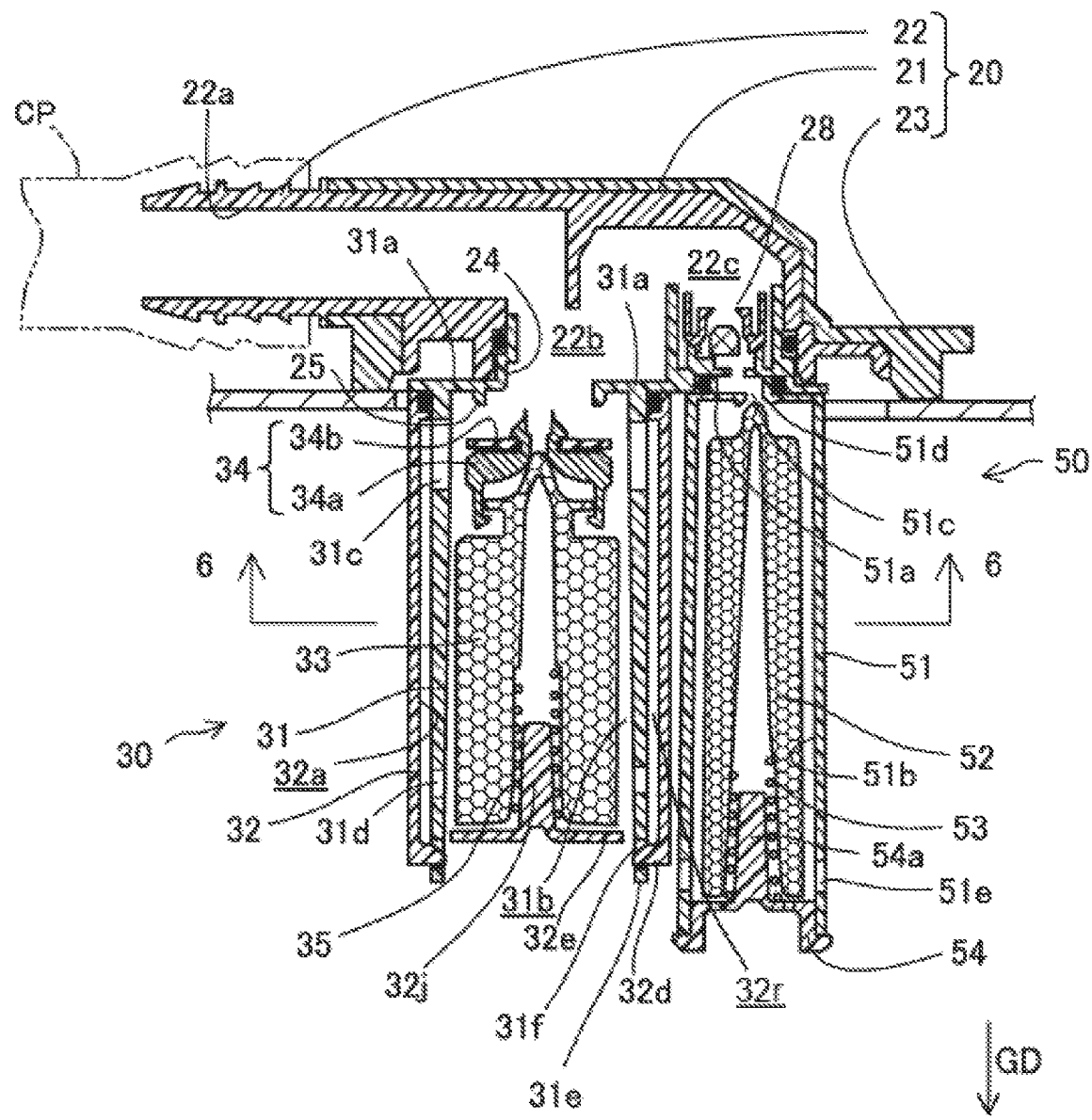
FIG. 3 is an explanatory diagram for illustrating a cross-sectional view of the fuel valve taken along the line 3-3 in FIG. 2.
Figure 4:
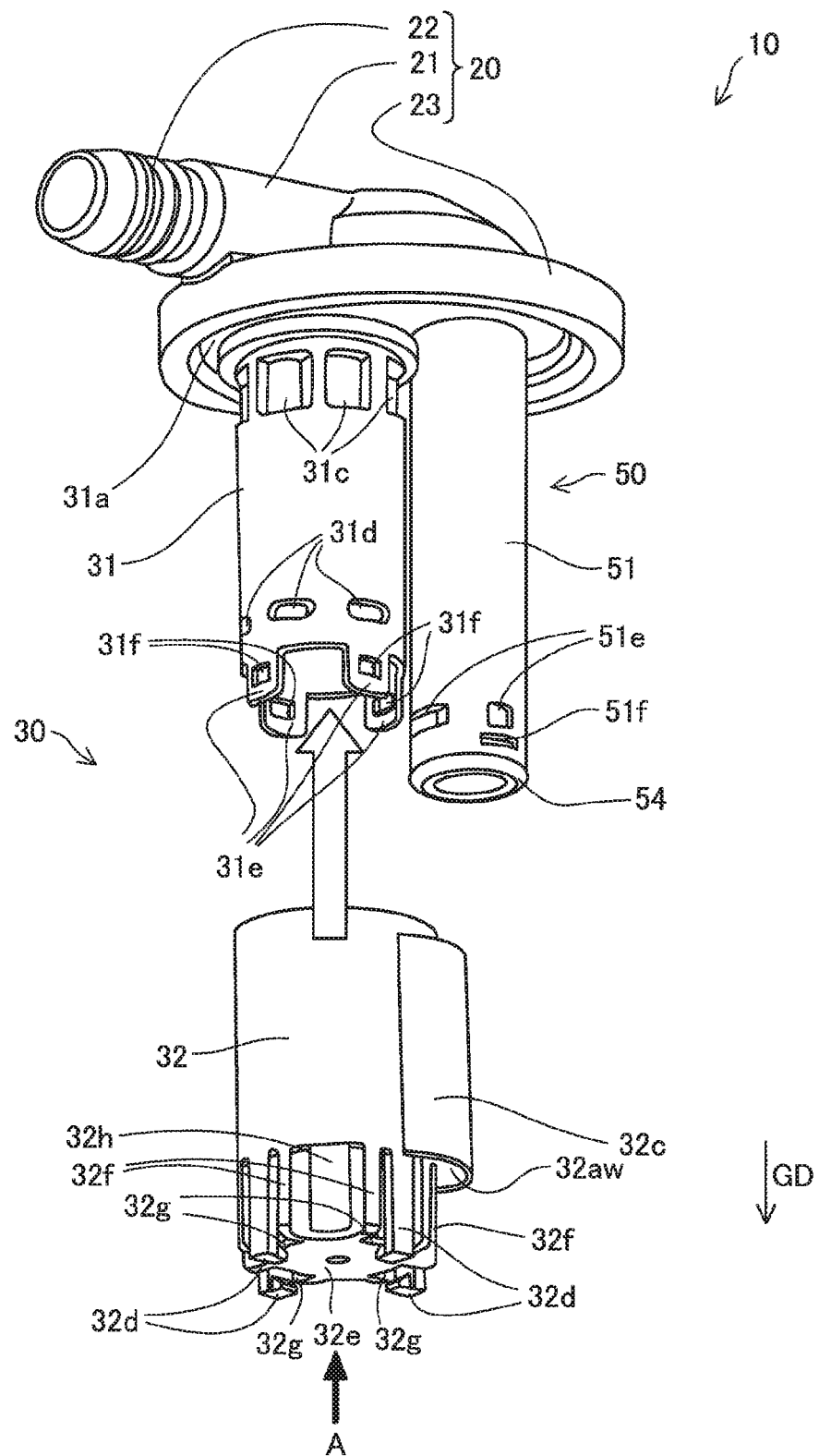
FIG. 4 is a perspective view for illustrating how the fuel valve is assembled.
Figure 5:
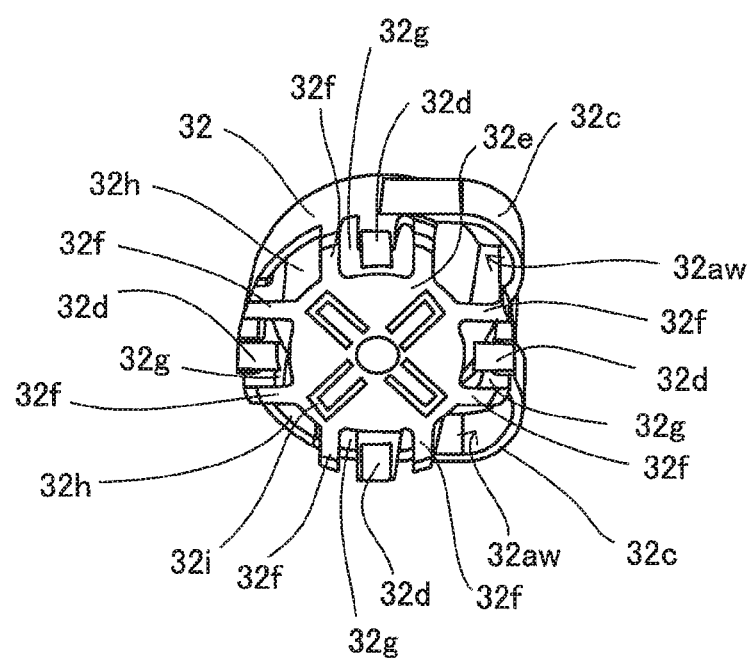
FIG. 5 is an explanatory diagram for illustrating a perspective view of a casing as viewed from the direction of the arrow A in FIG. 4.
Figure 6:
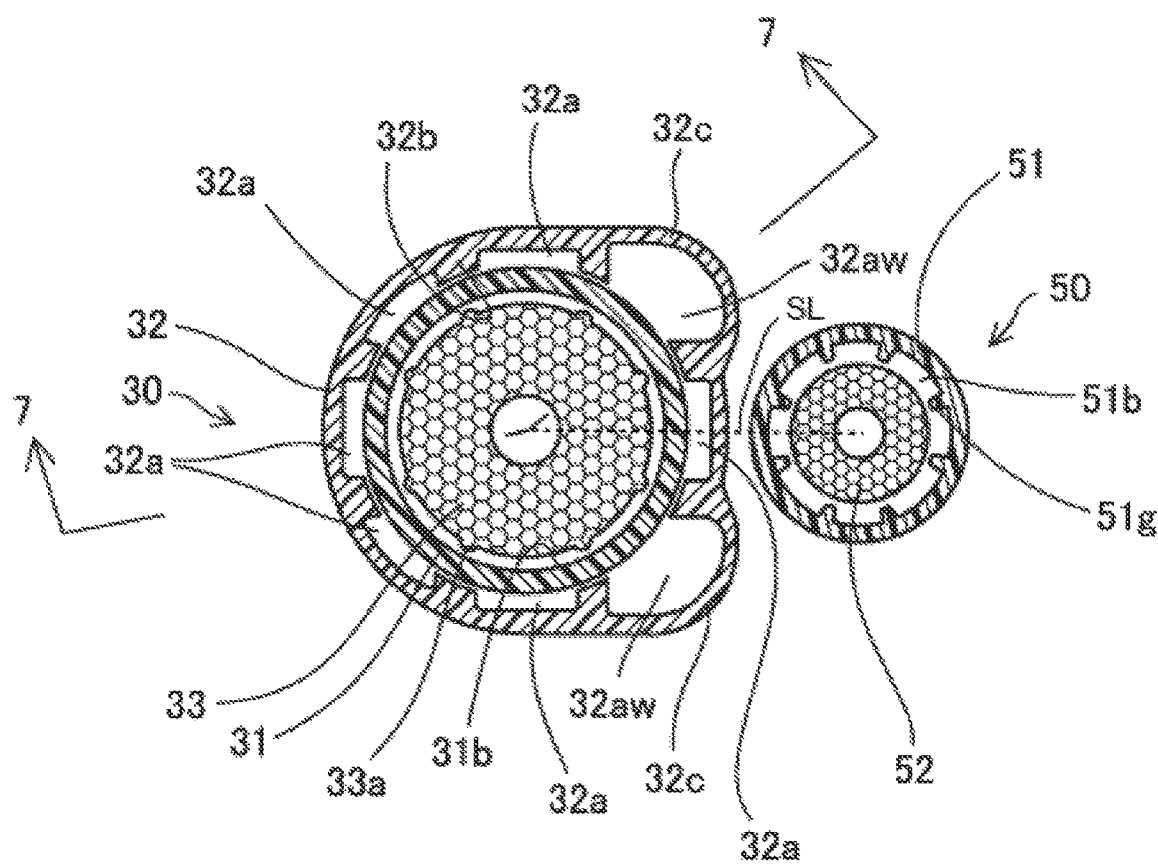
FIG. 6 is an explanatory diagram for illustrating a cross-sectional view of a main portion of the fuel valve taken along the line 6-6 in FIG. 3.
Figure 7:
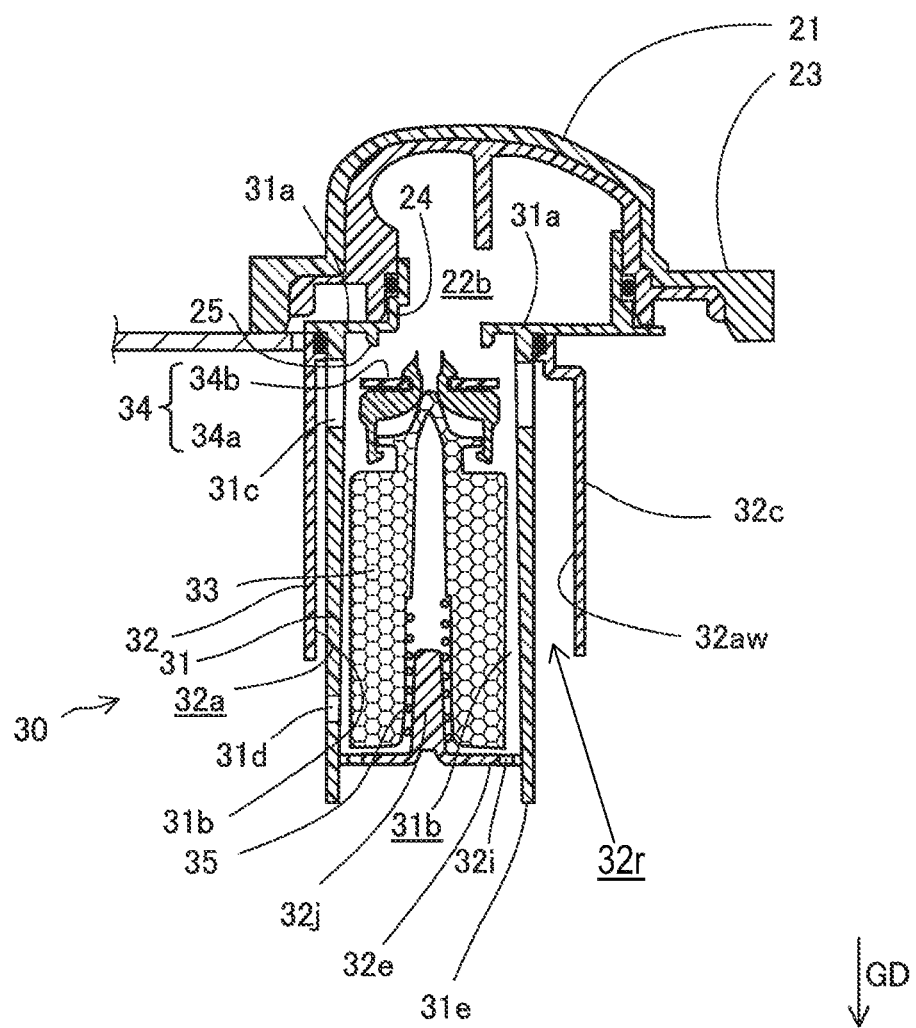
FIG. 7 is an explanatory diagram for illustrating a cross-sectional view of the main portion of the fuel valve taken along the line 7-7 in FIG. 6.

FIG. 2 is a perspective view for illustrating an outer appearance of the fuel valve 10 according to the present embodiment. FIG. 3 is an explanatory diagram for illustrating a cross-sectional view of the fuel valve 10 taken along the line 3-3 in FIG. 2. FIG. 4 is a perspective view for illustrating how the fuel valve 10 is assembled. FIG. 5 is an explanatory diagram for illustrating a perspective view of a casing as viewed from the direction of the arrow A in FIG. 4. FIG. 6 is an explanatory diagram for illustrating a cross-sectional view of a main portion of the fuel valve 10 taken along the line 6-6 in FIG. 3. FIG. 7 is an explanatory diagram for illustrating a cross-sectional view of the main portion of the fuel valve 10 taken along the line 7-7 in FIG. 6. Wiring diagrams between components have been omitted from the drawings as appropriate in order to facilitate understanding of component configurations.

In the fuel valve 10, a first float valve 30 and a second float valve 50 are provided to a lid member 20, which is a member to be fixed to the fuel tank FT. The first float valve 30 and the second float valve 50 are adjacent to each other. In this embodiment, the members that constitute both float valves and the lid member 20 are resin molded members molded using, for example, polyacetal (POM). However, this does not apply to a float and a spring to be described later. The resin used for molding is not limited to polyacetal and may be any other oil resistant engineering plastic such as polyamide (PA). Further, the resin used for molding is not limited to an engineering plastic and may be any type of oil resistant resin.

The lid member 20 includes a lid body member 21, a pipe body portion 22 that protrudes toward the side from the center of the lid body member 21 and a flange 23 formed on an outer periphery of the lid body member 21. These members are formed integrally. The canister connection pipe CP is mounted to the pipe body portion 22. The lid member 20 is the member to which the first float valve 30 and the second float valve 50 are attached. The flange 23 is a member that is used for fixing the fuel valve 10 to the fuel tank FT (see FIG. 1) through welding. In the lid member 20, a first gas influx chamber 22b and a second gas influx chamber 22c are formed inside the pipe body member 22 on a side of the lid member 20 covered by the lid body member 21. The first gas influx chamber 22b and the second gas influx chamber 22c are in communication with each other. The gas influx chambers 22b and 22c communicate with a passage 22a. In the first gas influx chamber 22b, a first gas influx hole 24 is formed on a side of the first gas influx chamber 22b on which the first float valve 30 is assembled. An annular first valve seat 25 is formed on a lower periphery of the first gas influx hole 24. The first gas influx hole 24 corresponds to a first connection hole according to the present disclosure. The second gas influx chamber 22c is positioned on a side on which the second float valve 50 is assembled. The second gas influx chamber 22c sends in, to the first gas influx chamber 22b, fuel vapor that has passed through the second float valve 50 (to be described later) via a gas guidance passage mechanism 28 positioned above the second float valve 50.

The first float valve 30 includes a first casing 31, a second casing 32, a first float 33, a first float valve body portion 34 and springs 35. A mounting plate portion 31a is provided on an upper end side of the first casing 31. The mounting plate portion 31a is assembled and mounted to the lid member 20 in a liquid-tight fashion through interposing a sealing member. Assembling and mounting the mounting plate portion 31a in this way forms an assembly region for the first gas influx hole 24 and the first valve seat 25 in the first gas influx chamber 22b and an assembly region for the gas guidance passage mechanism 28 in the second gas influx chamber 22c.

The first casing 31 is a tubular cylindrical body formed by being hung from the mounting plate portion 31a. An internal region 31b inside the first casing 31 communicates with the first gas influx hole 24. The first casing 31 houses the first float 33 in the internal region 31b and includes a floating/ sinking region in which the first float 33 floats/sinks. There remains a space along a vertical direction on an outer side of the first float 33 even when the first float 33 is housed in the internal region 31b of the first casing 31. In addition, in the first casing 31, upper-end-side ventilation windows 31c are formed on an upper side of the wall surface that forms the internal region 31b, and lower-end-side ventilation windows 31d are formed on a lower side of the wall surface. Pluralities of the upper-end-side ventilation windows 31c and the lower-end-side ventilation windows 31d are formed along a circumferential direction in the wall surface that forms the internal region 31b. The upper-end-side ventilation window 31c corresponds to a ventilation window according to the present disclosure.

In addition, protruding pieces 31e are formed on a lower end of the first casing 31 at equal pitches along the circumferential direction. Each protruding piece 31e is provided with a through hole 31f that is used for assembly with the second casing 32 (to be described later). In the present embodiment, as illustrated in FIG. 4, the protruding pieces 31e are formed at four positions at equal pitches. The protruding pieces 31e and the through holes 31f correspond to engaged portions for engagement with the second casing 32.

The first float 33 is made of an appropriate oil resistant resin such as polyacetal. As illustrated in FIG. 6, convex strips 33a are formed at equal pitches on the outer periphery of the first float 33. The convex strips 33a are formed in an axial direction of the float and protrude outward. In addition, the first float 33 is incorporated into the first casing 31 such that the first float 33 may move in the internal region 31b of the first casing 31. The first float valve body portion 34 includes a resin valve body base 34a that is mounted to a tip of the first float 33 and a valve body 34b that is mounted onto the valve body base 34a. The valve body 34b is a sealing member made of an elastic material such as elastic rubber. In a state where the second casing 32 (to be described later) is assembled (see FIG. 3), the first float 33 that includes the first float valve body portion 34 is subject to biasing force of the springs 35 that bias vertically upward from the second casing 32. The first float 33 is also subject to vertically upward buoyancy according to the fuel liquid level of the fuel having entered in the internal region 31b. The first gas influx hole 24 is opened/closed due to floating/sinking movement of the first float 33 generated by the first float 33 being subject to this buoyancy. In other words, the first float 33 moves vertically upward within the internal region 31b when the sum of the buoyancy generated by the fuel having entered in the internal region 31b and the biasing force of the springs 35 is greater than the weight of the first float 33. Then, the valve body 34b pushes against the first valve seat 25 to close the first gas influx hole 24. Alternatively, if the fuel liquid level is low and the fuel has not entered the internal region 31b, the weight of the first float 33 is greater than the biasing force of the springs 35 and the first float 33 moves vertically downward within the internal region 31b. As a result, the valve body 34b no longer pushes against the first valve seat 25 and the first gas influx hole 24 opens. The floating/sinking of the first float 33 causes the plurality of convex strips 33a formed at equal pitches to operate in order to facilitate smooth movement of the first float 33. However, the convex strips 33a do not need to be provided and the number of convex strips 33a and the pitch may be set arbitrarily. The convex strips 33a may be provided at uneven pitches, or the aspect may not include the convex strips 33a.

As illustrated in FIG. 4, the second casing 32 is assembled so as to surround the first casing 31 from a lower end side of the first casing 31. After being assembled, the second casing 32 is fixed in a liquid-tight fashion to a lower surface of the mounting plate portion 31a and an outer peripheral wall of the first casing 31 on an upper edge of the casing through interposing a sealing member. In the assembled state illustrated in FIG. 2, the second casing 32 surrounds the first casing 31 from the side of the first gas influx hole 24 and forms a gap region 32r between the second casing 32 and the outer peripheral wall of the first casing 31. This gap region 32r includes a first ventilation passage 32a. As illustrated in FIGS. 3 and 6, the first ventilation passage 32a is formed in the gap region 32r that surrounds the periphery of the first casing 31 and is sectioned by ribs 32b provided on an inner side of the second casing 32. In the present embodiment, the gap region 32r includes first ventilation passage 32a is formed as five ventilation passages. As illustrated in FIGS. 2, 4, 5 and 6, parts of the casing wall of the second casing 32 are shaped as outer protruding walls 32c which protrude toward a radially outer side. The gap region 32r includes second ventilation passages 32aw which are surrounded by the outer protruding walls 32c. As illustrated in FIGS. 2 and 4, the second ventilation passages 32aw are passages provided on the radially outer side across the gap region in which the second casing 32 surrounds the first casing 31. In the fuel valve 10 according to the present embodiment, the second ventilation passages 32aw formed by the second casing 32 in the first float valve 30 are formed between the first casing 31 and second casing 32. As a result, the second casing 32 and the second float valve 50 (to be described later) are not connected to each other along a straight line SL which is the shortest connection distance between the axes of the second casing 32 and the second float valve 50. Functions of the first ventilation passage 32a and the second ventilation passage 32aw are described later in relation to other configurations of the second casing 32.

As illustrated in FIGS. 4 and 5, the second casing 32 includes engagement arms 32d provided at equal pitches about the axis of the second casing 32 on a lower end side of the second casing 32. The engagement arms 32d protrude downward from a base surface plate 32e. In other words, the base surface plate 32e is held by a plurality of bridges 32f and the second casing 32 causes the engagement arms 32d to protrude downward from the base surface plate 32e between the bridges 32f. The engagement arms 32d of the second casing 32 are formed at pitches equal in length to those between the protruding pieces 31e of the first casing 31. The second casing 32 also includes protruding piece insertion holes 32g that receive insertion of the protruding pieces 31e of the first casing 31. The protruding piece insertion holes 32g are formed between the engagement arms 32d and the base surface plate 32e on the base surface of the second casing 32. Therefore, as illustrated in FIGS. 2 and 3, when the second casing 32 is attached to the first casing 31, the engagement arms 32d of the second casing 32 engage with the protruding pieces 31e of the first casing 31 that protrude from the protruding piece insertion holes 32g by being inserted into the through holes 31f in the protruding pieces 31e. The engagement arm 32d of the second casing 32 functions as an engagement portion according to the present disclosure.

In the second casing 32, spaces between the bridges 32f where the engagement arms 32d are not formed are configured as communication window portions 32h. The communication window portions 32h communicate with the first ventilation passages 32a at lower ends of the first ventilation passages 32a. The communication window portions 32h are in a state where the lower-end-side ventilation windows 31d of the first casing 31 are connected to outside air when the second casing 32 is attached to the first casing 31.

The second casing 32 also includes U-shaped through holes 32i formed at equal pitches in the base surface plate 32e. Vapor inside the tank and fuel that has increased to the liquid level directly enters the internal region 31b in the first casing 31 from the through holes 32i. In addition, a central protrusion 32j is formed at the center of the base surface plate 32e of the second casing 32. The central protrusion 32j stands up toward an inner side of the second casing 32. The springs 35 are attached to an outer side of the central protrusion 32j. The central protrusion 32j and the base surface plate 32e hold the first float 33 with the springs 35 interposed between the central protrusion 32j and the base surface plate 32e. Therefore, the base surface plate 32e works in cooperation with the central protrusion 32j to function as a holding seat face portion according to the present disclosure.

In order to assemble the first float valve 30, first, the first casing 31 is mounted and fixed to the mounting plate portion 31a. Then, the first float 33 assembled with the first float valve body portion 34 is incorporated into the second casing 32 with the springs 35 set at the central protrusion 32j. The second casing 32 now incorporated with the first float 30 is attached to the first casing 31 from the lower end side of the first casing 31 so as to surround the first casing 31, and is then mounted and fixed to the mounting plate portion 31a. As a result, assembly of the first float valve 30 to the lid member 20 is complete. Alternatively, the first casing 31 mounted and fixed to the mounting plate portion 31a illustrated in FIG. 4 is disposed upside down such that an open side of the first casing 31 is a vertically upper side. Then, the first float 33 and the springs 35 may be assembled in the first casing 31 from the open side of the first casing 31 and the second casing 32 may be attached to the first casing 31 from the upper side and mounted and fixed to the mounting plate portion 31a.

Next, the second float valve 50 is described. The second float valve 50 is provided below the lid member 20 aligned with the above-described first float valve 30. The first float valve 30 is a valve mechanism that separately ventilates fuel vapor. The second float valve 50 includes a third casing 51, a second float 52, springs 53 and float holding members 54. A mounting plate portion 51a is provided on an upper end side of the third casing 51. The mounting plate portion 51a is attached and fixed in a liquid-tight manner to the mounting plate portion 31a of the first float valve 30 interposed with a sealing member.

The third casing 51 is a tubular cylindrical body formed by being hung from the mounting plate portion 51a. A second gas influx hole 51c that communicates with the second gas influx chamber 22c is formed on an upper end side of an internal region 51b in the third casing 51. An annular second valve seat 51d is formed around the periphery of the second gas influx hole 51c. Fuel vapor that has entered from the second gas influx hole 51c passes through the gas guidance passage mechanism 28 located above the second gas influx hole 51c to flow into the second gas influx chamber 22c and then the first gas influx chamber 22b. The second gas influx hole 51c corresponds to a second connection hole according to the present disclosure.

The third casing 51 houses the second float 52 in the internal region 51b and has a floating/sinking region in which the second float 52 floats/sinks. A space along a vertical direction remains on an outer side of the second float 52 even when the second float 52 is housed in the internal region 51b in the third casing 51. This space extends downward from the first casing 31 of the first float valve 30. As illustrated in FIG. 6, an inner peripheral wall of the internal region 51b in the third casing 51 is provided with a plurality of convex strips 51g formed at equal pitches. The convex strips 51g protrude inward. The convex strips 51g are formed in a line along an axial direction of the second float 52 (to be described later) and guide floating/sinking of the second float 52. The third casing 51 may be configured to not include the convex strips 51g or have unequal pitches.

In addition, ventilation windows 51e and engagement holes 51f are formed in the wall surface of the third casing 51 that forms the internal region 51b. In the third casing 51, the internal region 51b is defined as a region that houses the second float 52 and a region in which the second float 52 floats/sinks. A plurality of the ventilation windows 51e are formed in a peripheral direction in the wall surface that forms the internal region 51b. The ventilation windows 51e are located on a lower side below a lower end of the second casing 32 in the first float valve 30. The engagement holes 51f are used for engagement of a float holding member 54 (to be described later).

Similar to the first float 33, the second float 52 is made of an appropriate oil-resistant and lightweight resin or a foaming resin and is assembled in the third casing 51 such that the second float 52 may move in the internal region 51b of the third casing 51. The float holding member 54 is attached and fixed to an open lower end of the third casing 51 through engagement arms (not shown) of the float holding member 54 being engaged with the engagement holes 51f. The float holding member 54 holds the second float 52 together with a central protrusion 54a, with the springs 53 interposed between the central protrusion 54a and the float holding member 54. Then, the second float 52 is subject to biasing force of the springs 53 on a vertical lower side and moves by floating/sinking along the vertical direction within the internal region 51b according to the fuel liquid level of the fuel that has entered the internal region 51b, to thereby open/close the second gas influx hole 51c. In other words, the second float 52 moves vertically upward in the internal region 51b to close the second gas influx hole 51c when buoyancy generated by the fuel having entered in the internal region 51b is greater than the sum of the biasing force of the springs 35 configured as tension springs and the weight of the second float 52. Alternatively, if the fuel liquid level is low and the fuel has not entered the internal region 51b, the biasing force of the springs 53 and the weight of the second float 52 cause the second float 52 to move vertically downward in the internal region 51b and open the second gas influx hole 51c.

In order to assemble the second float valve 50, first, the second float 52 is incorporated into the third casing 51. Then, the float holding member 54 that holds the springs 53 against the central protrusions 54a is engaged with and fixed to the third casing 51. Then, the third casing 51 that has been incorporated with the second float 52 is mounted and fixed to the mounting plate portion 31a via the mounting plate portion 51a. As a result, assembly of the second float valve 50 to the lid member 20 is complete.

2. Explanation of Operation

The above-described fuel valve 10 including the first float valve 30 and the second float valve 50 operates in the following manner. When the fuel liquid level in the fuel tank FT is low as illustrated in FIG. 1, the first float 33 is located on the base surface plate 32e side in the first float valve 30. In the second float valve 50, the second float 52 is located on the float holding member 54 side. With the fuel valve 10 in a state where both the first gas influx hole 24 in the first float valve 30 and the second gas influx hole 51c in the second float valve 50 are open, the internal region 31b in the first float valve 30 and the internal region 51b in the second float valve 50 are made to communicate with the passage 22a.

In this state, in the first float valve 30, the fuel vapor in the fuel tank FT passes through the through holes 32i in the base surface plate 32e to enter the internal region 31b in the first casing 31. In addition, the fuel vapor passes through the first ventilation passages 32a and the second ventilation passages 32aw in the second casing 32 to enter the internal region 31b from the upper-end-side ventilation windows 31c of the first casing 31. Further, the fuel vapor enters the internal region 31b even if the fuel vapor passes through the lower-end-side ventilation windows 31d in the first casing 31 that communicate with outside air from the communication window portion 32h in the second casing 32. In this case, the fuel vapor enters the first ventilation passages 32a from the communication window portion 32h or the protruding piece insertion holes 32g in the first casing 31 and enters the second ventilation passages 32aw from an opening on a lower end side of the second ventilation passages 32aw. The fuel vapor that has entered the internal region 31b flows into the passage 22a in the pipe body portion 22 from the first gas influx hole 24 and is guided to the canister CT by the canister connection pipe CP. The second ventilation passage 32aw has a larger open cross-sectional area than that of the first ventilation passage 32a. Because of this, a large amount of fuel vapor is guided to the upper-end-side ventilation windows 31c. In the second float valve 50, the fuel vapor in the fuel tank FT passes through the ventilation windows 51e in the third casing 51 to enter the internal region 51b. The fuel vapor that has entered the internal region 51b passes through the gas guidance passage mechanism 28 from the second gas influx hole 51c and flows into the second gas influx chamber 22c. Then, the fuel vapor passes through the first gas influx chamber 22b to reach the passage 22a and is guided to the canister CT by the canister connection pipe CP.

When the fuel liquid level increases due to fuel supply to the fuel tank FT and reaches a lower end side of the first casing 31 that forms the second ventilation passages 32aw and the first ventilation passages 32a in which the fuel liquid level is disposed highest in the present embodiment, a majority of the ventilation of the fuel supply is blocked. As a result, the difference in pressures inside the first float valve 30 and the fuel tank FT cause the fuel to enter the first float valve 30. Because the fuel liquid level inside the first casing 31 increases, the first float 33 floats up and the first float valve body portion 34 closes the first gas influx hole 24. As a result, if the fuel continues to be supplied from the fuel nozzle FN after the fuel tank FT becomes full, the fuel liquid level in the fuel injection pipe IP rises and fuel supply is stopped because the fuel nozzle FN detects the fuel. In other words, the first float valve 30 functions as a full-tank detection valve.

Through arranging lower end positions of the second ventilation passages 32aw above lower end positions of the first ventilation passages 32a, the fuel liquid level where rising buoyancy acts on the first float 33 may be measured on a side higher than the fuel liquid level.

As described above, the second float valve 50 ensures ventilation when fuel is supplied. In addition, the second float valve 50 functions as a cutoff valve that is disposed so that the fuel in the fuel tank TF does not flow out to the canister CT through the canister connection pipe CP when the fuel rises as the vehicle turns sharply or makes other sharp movements. In other words, the fuel valve 10 includes a full-tank detection valve and a cutoff valve in parallel.

In the above-described fuel valve 10 according to the present embodiment, the floating/sinking region in the first float 33 in the first float valve 30 is the internal region 31b in the first casing 31. Therefore, even if fuel enters the internal region 31b, swelling on the internal peripheral wall side of the first casing 31 is substantially equal. Because of this, floating/sinking movement operation of the first float 33 can be stabilized. In addition, according to the fuel valve 10 of the present embodiment, fuel gas ventilation via the first gas influx hole 24 is ensured between the plurality of first ventilation passages 32a and the two second ventilation passages 32aw that have a wider passage cross-sectional area than the first ventilation passages 32a. Therefore, a sufficient ventilation passage for fuel vapor can be secured and insufficient ventilation of fuel vapor can be suppressed.

In the fuel valve 10 according to the present embodiment, the first casing 31 of the first float valve 30 is provided with the through holes 31f and the protruding pieces 31e of the second casing 32 are engaged with the through holes 31f with the second casing 32 attached so as to surround the first casing 31. Therefore, according to the fuel valve 10 of the present embodiment, both casings can be engaged with each other and assembly work can be simplified through attaching the second casing 32 so as to surround the first casing 31.

In the fuel valve 10 according to the present embodiment, the base surface plate 32e is provided on a lower end of the second casing 32 and holds the first float 33 with the second casing 32 assembled so as to surround the first casing 32. Therefore, according to the fuel valve 10 of the present embodiment, assembly work can be simplified and the number of components can be reduced because the first float 33 can be held through assembling the second casing 32 so as to surround the first casing 31, in which the first float 33 is already assembled. In addition, because the fuel valve 10 according to the present embodiment includes the central protrusion 32j on the base surface plate 32e for holding the first float 33, the second casing 32 can be attached to the first casing 31 with the springs 35 and the first float 33 already assembled in the second casing 32. In other words, there is no need to temporarily fix the springs 35 when assembling the casing, and assembly work is simplified.

The fuel valve 10 according to the present embodiment includes the second float valve 50 aligned with the first float valve 30. Therefore, even if the second gas influx hole 51c in the second float valve 50 is opened/closed by the second float 52, ventilation/blockage of fuel vapor from the pipe body portion 22 to the canister connection pipe CP is achieved. In addition, in the fuel valve 10 according to the present embodiment, the second ventilation passage 32aw, which is formed between the first casing 31 and the second casing 32, avoids any connection with the second float valve 50 along a straight line SL that connects axes of the second casing 32 and the second float valve 50 to each other, as shown in FIG. 6. Therefore, even if the first float valve 30 and the second float valve 50 are arranged next to each other as closely as possible, dead space in both valves can be effectively used for forming the second ventilation passage 32aw. As a result, space savings can be achieved in the fuel valve 10 and the size of the device can be reduced.

The present disclosure is not limited to the above-described embodiments, examples or modification examples and may be implemented in the form of various other configurations without departing from the gist of the present disclosure. For example, the technical characteristics in the embodiments, examples or modification examples that correspond to the technical characteristics in the aspects described in SUMMARY may be replaced or combined as necessary in order to partly or entirely solve the problems described above or partly or entirely achieve the above-described effects. In addition, any technical characteristics not described as necessary in the present specification may be omitted as necessary.

In the above-described embodiment, the fuel valve 10 includes the second float valve 50 aligned with the first float valve 30, but the fuel valve 10 may include only the first float valve 30.

In the above-described embodiment, the protruding pieces 31*e* in the second casing 32 are engaged with the through holes 31*f* in the first casing 31, but a second casing 32 that does not include the protruding pieces 31*e* may be fixed in a liquid-tight fashion to the lid member 20 using the mounting plate portion 31*a*. Additionally, the second casing 32 may be bonded and fixed to the first casing 31.

In the above-described embodiment, the second casing 32 is provided with the base surface plate 32*e* which holds the first float 33, but a base surface plate for holding a float may be retrofitted to the second casing 32 in a similar manner to the second float valve 50.

What is claimed is:

1. A fuel valve that enables and blocks communication with an inside of a fuel tank, the fuel valve comprising:
    a cylindrical first step casing forming an internal region that communicates with a first connection hole connected externally to the fuel tank, the first casing having ventilation windows formed in a wall that forms the internal region;
    a float valve being incorporated into the first casing such that the float valve moves within the internal region of the first casing, the float valve opening/closing the first connection hole through the float moving by floating/sinking in the internal region according to a fuel liquid level in the internal region;
    a second casing including a wall surrounding a periphery of the first casing;
    a first ventilation passage surrounded by a part of an external wall of the first casing and a part of an internal wall of the second casing; and
    a second ventilation passage surrounded by another part of the external wall of the first casing and another part of the internal wall of the second casing, the second ventilation passage being provided separately from the first ventilation passage, wherein
    the first and second ventilation passages guide fuel vapor in the fuel tank to the ventilation windows in the wall of the first casing, the second ventilation passage has a larger passage cross-sectional area than that of the first ventilation passage.

2. The fuel valve in accordance with claim 1, wherein the first casing includes an engaged portion to be engaged with the second casing, and the second casing includes an engagement portion that engages with the engaged portion in a state where the second casing is attached to the first casing surrounding the first casing.

3. The fuel valve in accordance with claim 2, wherein the second casing includes a holding seat face portion that holds the float valve in a state where the second casing is attached to the first casing surrounding the first casing.

4. The fuel valve in accordance with claim 1, wherein the second casing includes a holding seat face portion that holds the float valve in a state where the second casing is attached to the first casing surrounding the first casing.

5. The fuel valve in accordance with claim 1, further comprising:
    a valve assembly including a second float valve configured to ventilate the fuel vapor from a second connection hole to a pipe body portion through opening/closing the second connection hole, the second connection hole being connected to the pipe body portion, and the valve assembly being aligned adjacent the second casing,
    wherein the second ventilation passage is formed at a position that does not overlap with a straight line that connects axes of the second casing and the valve assembly to each other.

* * * * *